(12) United States Patent
Davis et al.

(10) Patent No.: US 8,659,813 B2
(45) Date of Patent: Feb. 25, 2014

(54) NANOSCALE INTEGRATED BEAM SCANNER

(75) Inventors: Wyatt O. Davis, Bothell, WA (US); Taha Masood, Sammamish, WA (US)

(73) Assignee: Microvision, Inc., Redmond, WA (US)

(*) Notice: Subject to any disclaimer, the term of this patent is extended or adjusted under 35 U.S.C. 154(b) by 247 days.

(21) Appl. No.: 13/417,739

(22) Filed: Mar. 12, 2012

(65) Prior Publication Data

US 2013/0235441 A1 Sep. 12, 2013

(51) Int. Cl.
*G02B 26/00* (2006.01)
*G02B 26/08* (2006.01)

(52) U.S. Cl.
USPC ............. 359/238; 359/201.1; 359/202.1; 359/204.2; 359/204.4; 359/315; 359/298; 385/37

(58) Field of Classification Search
USPC .............. 359/204.1–204.5, 238, 298, 315, 359/320–322, 201.1–202.1; 385/4, 37
See application file for complete search history.

(56) References Cited

U.S. PATENT DOCUMENTS

| | | | | |
|---|---|---|---|---|
| 5,455,178 A | * | 10/1995 | Fattinger | 436/164 |
| 7,187,491 B1 | * | 3/2007 | Bratkovski | 359/321 |
| 2005/0083534 A1 | * | 4/2005 | Riza et al. | 356/477 |

* cited by examiner

*Primary Examiner* — James Phan
(74) *Attorney, Agent, or Firm* — Kevin D. Wills

(57) ABSTRACT

Briefly, in accordance with one or more embodiments, a beam scanner may comprise a nanophotonics chip to provide a scanned output beam. The nanophotonics chip comprises a substrate, a grating in-coupler formed in the substrate to couple a beam from a light source into the substrate, a modulator to modulate the beam, and a photonic crystal (PC) superprism to provide a scanned output beam that is scanned in response to the modulated beam.

24 Claims, 12 Drawing Sheets

NANOSCALE INTEGRATED BEAM SCANNER

BACKGROUND

Smaller sized projection displays, often referred to as pico projectors, may be utilized in mobile application and may include laser diode light sources and microelectromechanical system (MEMS) technology to provide the size and power consumption parameters for handheld and wearable devices. Current pico projectors may utilize a scanned beam display engine that includes red, green, and blue (RGB) laser light sources which emit beams that are deflected by a MEMS scanning mirror as a combined beam. The combined beam may be steered in two dimensions along two orthogonal axes to from an image projected on a display surface. A significant portion of the volume of such a pico projector may be occupied by beam combining optics and the MEMS scanning mirror subassembly. The MEMS scanning mirror may also be a major contributor to the total power consumption of the pico projector. Ideally, the number of applications for such a scanned beam display projector may be increased by reducing the size and/or power consumption of the scanned beam system.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
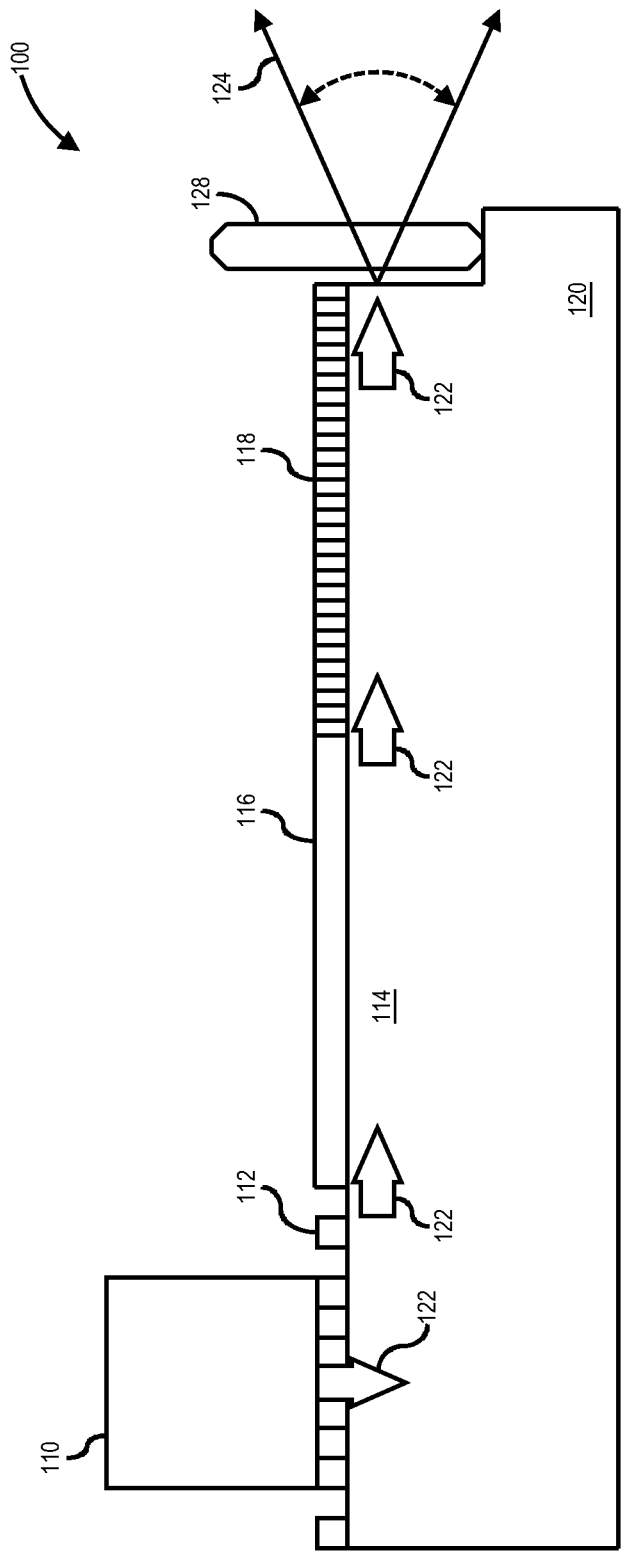
FIG. 1 is an elevation view of a nanoscale integrated beam scanner in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, an elevation view of a nanoscale integrated beam scanner in accordance with one or more embodiments will be discussed. As shown in FIG. 1, a nanoscale integrated beam scanner 100 may comprise a substrate 120 coupled to a light source 110 via a grating in-coupler 112. The grating in-coupler 112 may comprise a rectangular or blazed grating formed on a surface of the substrate 120. The light source 110 may comprise a semiconductor laser in one or more embodiments to emit a beam 122 into the grating in-coupler 112. The beam 112 may be directed through a waveguide 114 and modulated with a modulator 116 to provide a controlled input beam into a photonics crystal (PC) superprism 118. The beam 112 exits the PC superprism 118 as a scanned output beam 124 that has an angular dispersion that is a function of the modulation of the beam 112 by the modulator 116 and the superprism effect on the beam 112 by the PC superprism 118. The elements of the scanner 100 as shown in FIG. 1 may be integrated onto a single device referred to herein as a nanophotonics chip 126. Optionally, an optical element 128 such as a lens or similar device may be disposed on or adjacent to the nanophotonics chip 126 to provide optical shaping of the scanned output beam 124, for example according to the particular application in which the scanner 100 is utilized. In general, scanner 100 comprises a laser diode 110 attached to a nanostructured optical chip that couples the light from the laser diode into a scanning system that utilizes the photonic crystal superprism effect which amplifies a small change in the feed angle or feed wavelength. The feed angle or feed wavelength may be varied by a modulator 116 that utilizes an optoelectronic effect such as electronic modulation of refractive index. Alternatively, the feed angle may be altered via a mechanical modulator. In one or more embodiments, the modulator 116 may be capable of deflecting the beam angle by approximately 3 degrees, and the PC superprism 118 may be capable of amplifying this angular beam deflection by a factor of about 20 to result in a scanned output beam 124 having a scan angle of approximately 60 degrees, although the scope of the claimed subject matter is not limited in these respects. The PC superprism 118 also may be capable of controlling collimation of the beam 122 in the dimension parallel to the plane of the nanophotonics chip 126, and the optical element 128 may be a beam shaping optic that collimates the scanned light beam 124 in the orthogonal direction. Further details of the operation of the respective elements of the nanophotonics chip 126 are discussed, below. Although FIG. 1 illustrates a scanner 100 having a single light source 110, for example to provide a monochrome scanned output beam 124, the scanner 100 may be designed to have two or more colors from two or more light sources, an example of which is shown in and described with respect to FIG. 2, below.

Figure 2:
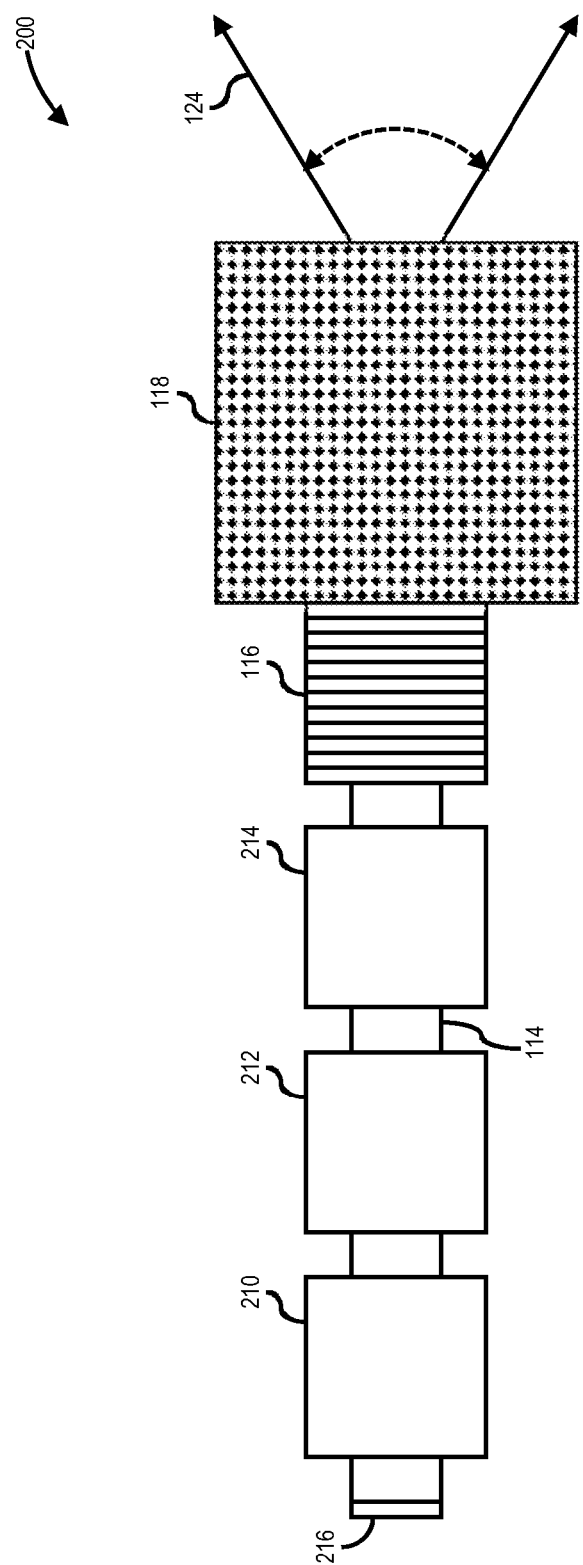
FIG. 2 is a top view of a nanoscale integrated beam scanner having three lasers to provide a three color output beam in accordance with one or more embodiments.

Referring now to FIG. 2, a top view of a nanoscale integrated beam scanner having three lasers to provide a three color output beam in accordance with one or more embodiments will be discussed. The nanoscale integrated beam scanner 200 of FIG. 2 is substantially similar to the nanoscale integrated beam scanner 100 of FIG. 1 except that the beam scanner 200 includes multiple light sources to provide a multi-colored scanned output beam 124. In particular, display 200 may include a first light source 210 to emit a beam of a first wavelength, a second light source 212 to emit a beam of a second wavelength, and a third light source 214 to emit a beam of a third wavelength. In one particular embodiment, light source 210 may comprise a red laser to emit a red laser beam, light source 212 may comprise a green laser to emit a green laser beam, and light source 214 may comprise a blue laser to emit a blue laser beam to provide a red, green, blue (RGB) scanned output beam 124. In the embodiment shown in FIG. 2, the waveguide 114 may combine the respective output beams from the individual light sources. Furthermore, the waveguide 114 may include an end 216 that is cleaved and high-reflector (HR) coated for the respective wavelengths of the individual light sources, for example HR coated for red, green, and blue, to further reflect the output light through the waveguide 114 toward the modulator 116 and PC superprism 118. An isometric view of the display 200 of FIG. 2 is shown in and described with respect to FIG. 3, below.

Figure 3:
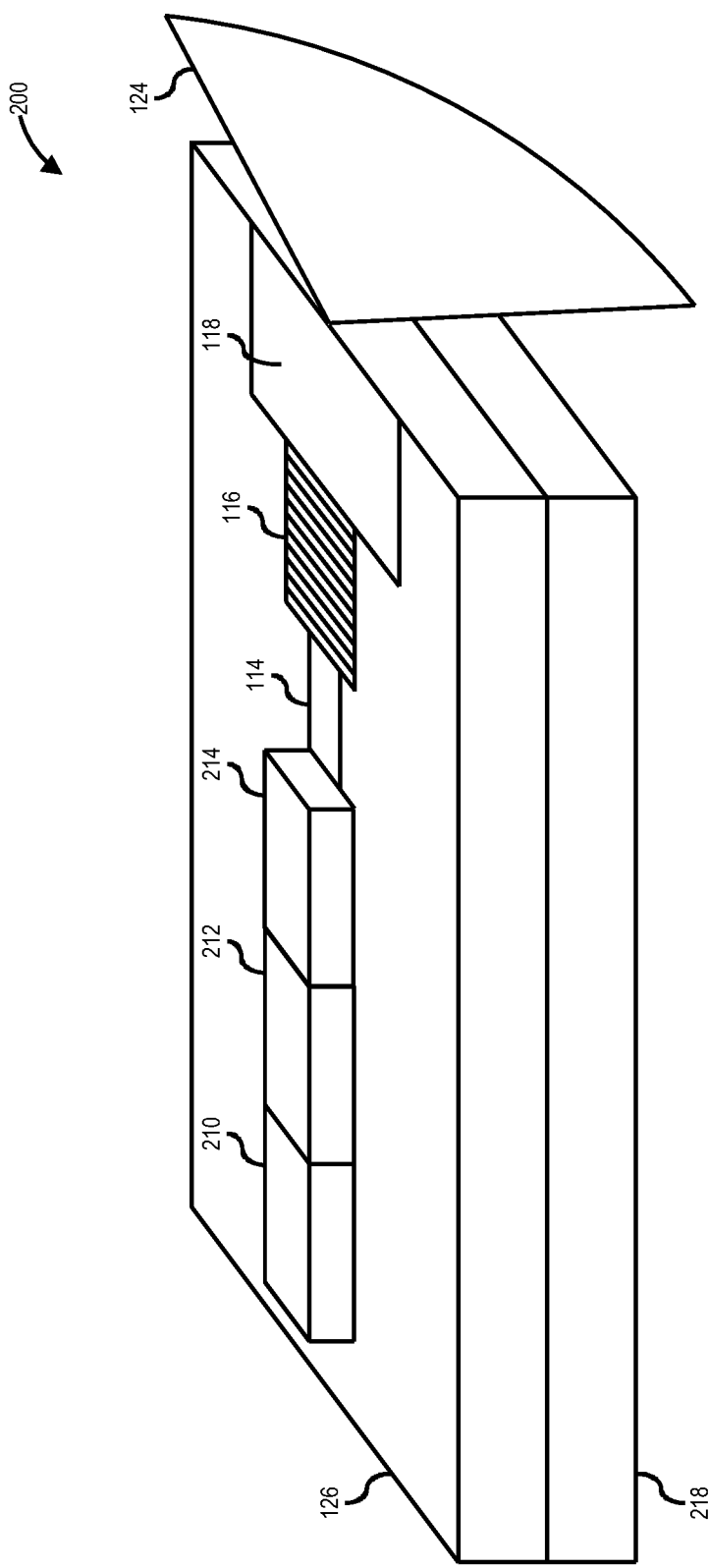
FIG. 3 is an isometric view of a nanoscale integrated beam scanner having three lasers to provide a three color output beam in accordance with one or more embodiments.

Referring now to FIG. 3, an isometric view of a nanoscale integrated beam scanner having three lasers to provide a three color output beam in accordance with one or more embodiments will be discussed. As shown in FIG. 3, the multicolor nanoscale integrated beam scanner 200 may comprise a first light source 210, a second light source 212, and a third light source 214 disposed on a surface of nanophotonics chip 126. Nanophotonics chip 126 in turn may be disposed on an electronics chip 218 which may have one or more circuits formed therein (not shown) to control one or more functions of the nanophotonics chip 126. The output beams from the light sources may pass through the waveguide 114, modulator 116, and PC superprism 118 to generate a multicolor scanned output beam 124.

Figure 4:
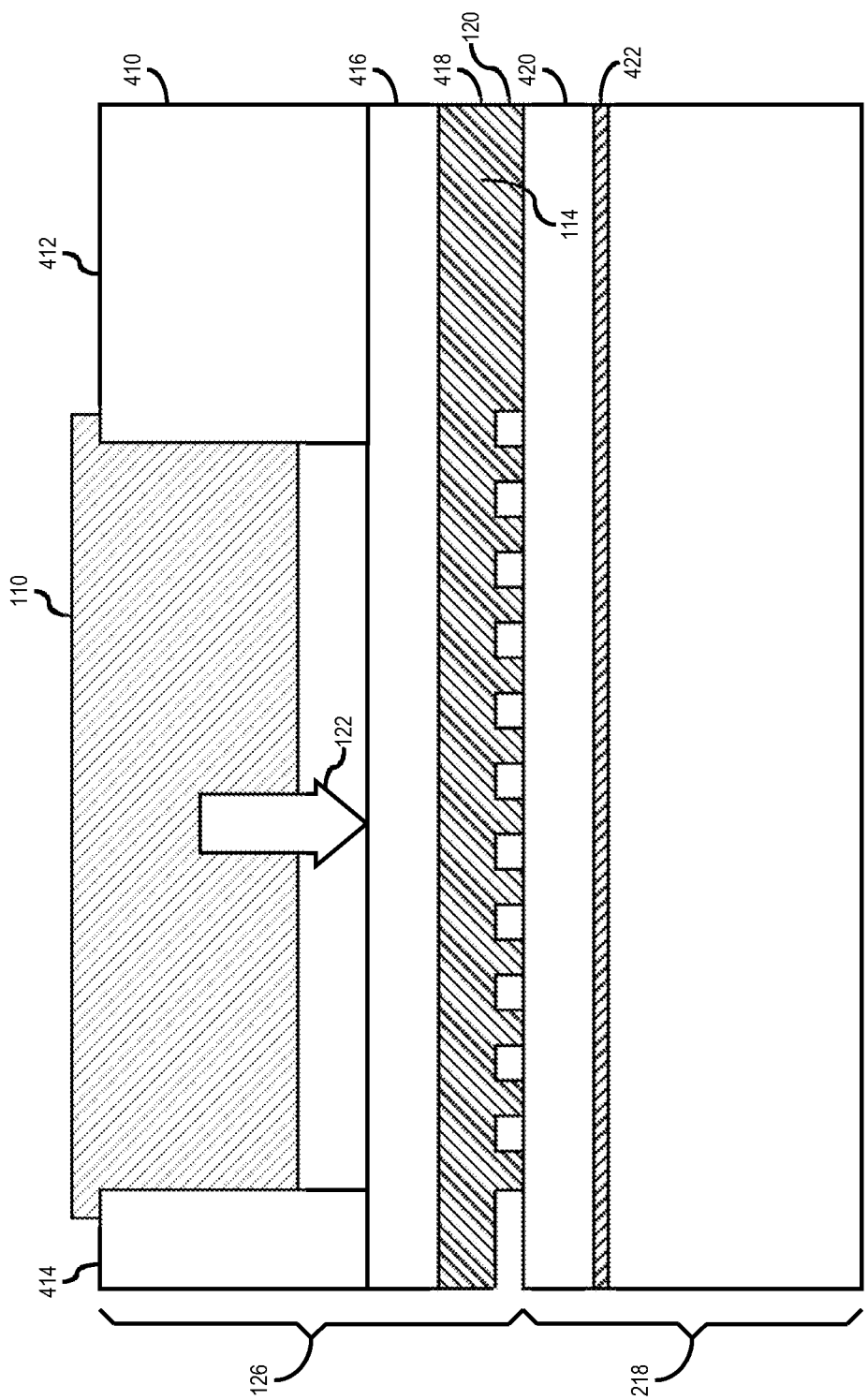
FIG. 4 is an elevation view of a grating in-coupler to couple a light beam into a nanophotonics chip of a nanoscale integrated beam scanner in accordance with one or more embodiments.

Referring now to FIG. 4, an elevation view of a grating in-coupler to couple a light beam into a nanophotonics chip of a nanoscale integrated beam scanner in accordance with one or more embodiments will be discussed. As shown in FIG. 4, the nanoscale photonics chip 126 may be disposed on electronics chip 218, for example as shown in and described with respect to FIG. 3, above. The nanoscale photonics chip 126 may also be referred to as nanophotonics chip. The nanophotonics chip 126 may be singulated from a wafer bonded to the substrate wafer 120 as shown in FIG. 1. The nanophotonics chip 126 may be structured similar to a silicon-on-insulator (SOI) wafer. The nanophotonics chip 126 may be structured with features that assist the attachment of a laser diode light source 110. For example, a handle layer 410 of the nanoscale photonics chip 126 may include structures 412 and 414 that may be utilized to securely mount the laser diode light source 110. The laser diode light source 110 may be mounted over a dielectric layer 416 which may comprise a low-index material such as silicon dioxide ($SiO_2$) and that may be about 1-2 micrometers (μm) in thickness in one or more embodiments. The nanoscale photonics chip 126 may further comprise a high-index device layer 418 material which may be about 1-5 μm in thickness. The high-index device layer 418 may have the grating in-coupler 112 formed therein, for example as a rectangular or blazed grating having a pitch of about 100 to about 300 nanometers (nm). The grating in-coupler 112 operates to collect the light 122 emitted by the laser diode light source 110 and redirect the light 122 toward the scanning elements via the waveguide 114. The electronics chip 218 may comprise a dielectric layer 420 having an index of refraction of about n~1.5. The dielectric layer 420 of the electronics chip 218 may be substantially symmetric with dielectric layer 416 of the nanophotonics chip 126 to create symmetry in the cross-section of the waveguide 114 formed in the nanophotonics chip 126. The dielectric layer 420 of the electronics chip 218 may be disposed adjacent to a metallic reflector 422 to reflect any extraneous light back toward grating in-coupler 112. Electronics chip 218 may further comprise a substrate 120 to provide overall structural integrity. The light beam 122 may travel in waveguide 114 toward the modulator 116, examples of which are shown in and described with respect to FIG. 5 and FIG. 6, below.

Figure 5:
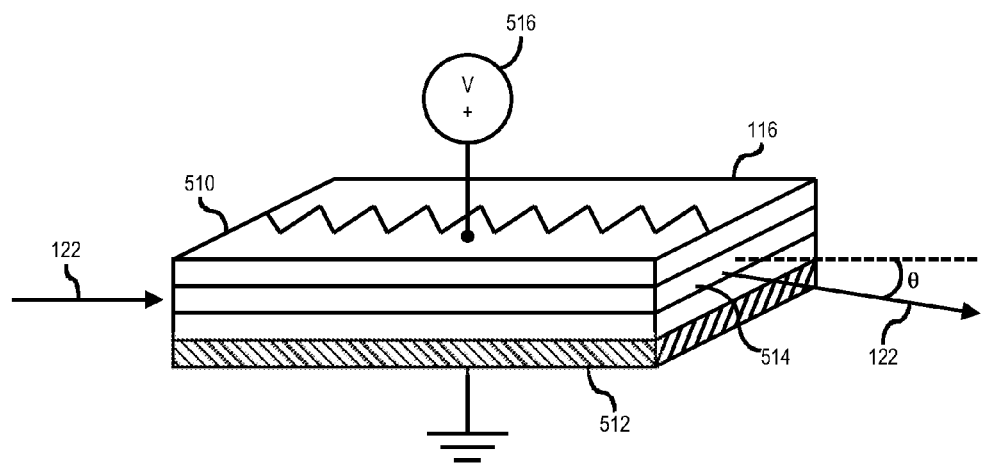
FIG. 5 is an isometric diagram of an electro-optic deflection of a nanoscale integrated beam scanner in accordance with one or more embodiments.

Referring now to FIG. 5, an isometric diagram of an electro-optic modulator of a nanoscale integrated beam scanner in accordance with one or more embodiments will be discussed. The electro-optic (EO) modulator 116 of FIG. 5 is one example embodiment of modulator 116 that deploys refractive index modulation of a thin film prism to deflect the light emitted from the waveguide 114. The EO modulator 116 may be capable of deflecting the light beam 122 by an angle, θ, which may be on the order of about 1 degree to about 3 degrees, before the light beam 122 enters the PC superprism 118 as the next stage. Candidate materials of the EO modulator 116 may include EO polymers and/or ferroelectric materials. The amount of deflection of the light beam 122 as it passes through the EO modulator 116 may be a function of the voltage 516 applied between an electrode 510 on a top surface of the EO modulator 116 and a substrate 512 as the light beam 122 traverses through a waveguide 514 of the EO modulator 116. Thus, the output beam scanning angle of the nanoscale integrated beam scanner 100 or scanner 200 may be controlled via controlling the voltage 516 applied to the EO modulator 116. Ferroelectrics such as lead zirconate titanate (PZT) and lithium niobate (LiNbO$_3$), or lithium tantalite (LiTaO$_3$) may be utilized as alternatives for EO modulator 116 that may provide larger EO coefficients resulting in larger deflection angles. Although FIG. 5 shows an electrically controlled modulator 116, the scope of the claimed subject matter is not limited in this respect, and the modulator 116 may comprise a mechanically controlled modulator 116 as shown in and described with respect to FIG. 6, below.

Figure 6:
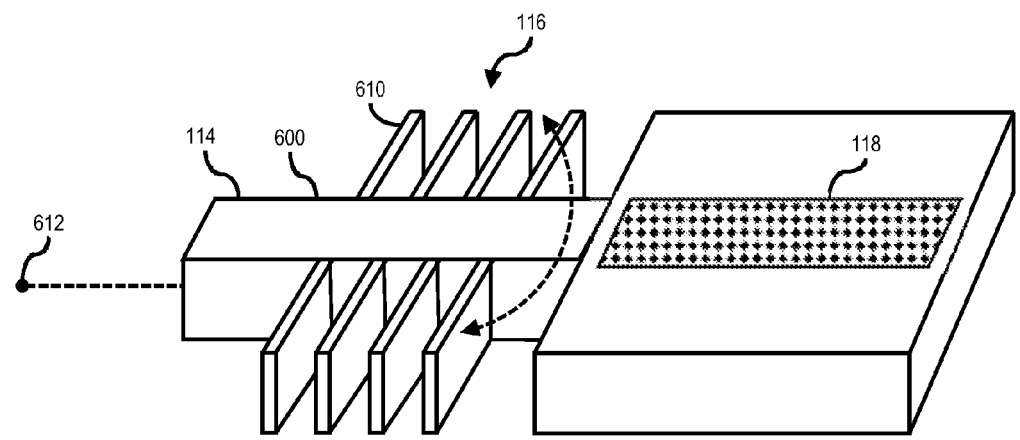
FIG. 6 is an isometric view of a comb drive modulator to provide angular deflection of a beam passing through a waveguide in a nanoscale integrated beam scanner in accordance with one or more embodiments.

Referring now to FIG. 6, an isometric view of a comb drive modulator to provide angular deflection of a beam passing through a waveguide in a nanoscale integrated beam scanner in accordance with one or more embodiments will be discussed. In contrast to an electro-optic (EO) modulator as shown in FIG. 5, the modulator 116 of FIG. 6 may be an electro-mechanical structure, for example an electrostatic comb drive structure 600 comprising comb fingers 610, that may be caused to rotate or pivot about a center of rotation 612 in response to a comb drive signal applied to the comb fingers 610 and opposing interdigitated comb fingers disposed on a substrate (not shown). The electrostatic comb drive structure 600 may be formed as a microelectromechanical (MEMS) structure, for example a rotary comb drive structure, which physically deflects the light beam 122 as it enters into the PC superprism 118. In operation, a portion of the waveguide 114 may be cantilevered and provided with an appropriate comb finger structure that moves the waveguide 114 side-to-side under application of a voltage to the comb fingers 610. In another embodiment, the PC superprism 118 may be suspended on a MEMS platform that is capable of rotating with respect to the waveguide 114. In such embodiments, the voltage to actuate a mechanical MEMS structure 600 may be lower than that involved for EO modulation, which may involve up to the order of hundreds of volts. MEMS actuation based on a mechanical resonance may involve voltages on the order of about 5 volts or less. A MEMS structure 600 may also be integrated into the materials of which nanoscale photonics chip 126 is fabricated. For either electrical or mechanical modulators 116, in one or more embodiments the modulator 116 may provide an angular deflection on the order of about 1 degree to 3 degrees at scan rates of up to about 50 kHz to support a 1080 p projection display with transmission loss on the order of about 1 dB and power consumption of about 50 mW. Although FIG. 6 shows one example of an electrostatic comb drive structure 600, other types of mechanical or electromechanical structures may be realized to implement modulator 116, and the scope of the claimed subject matter is not limited in this respect.

Figure 7:
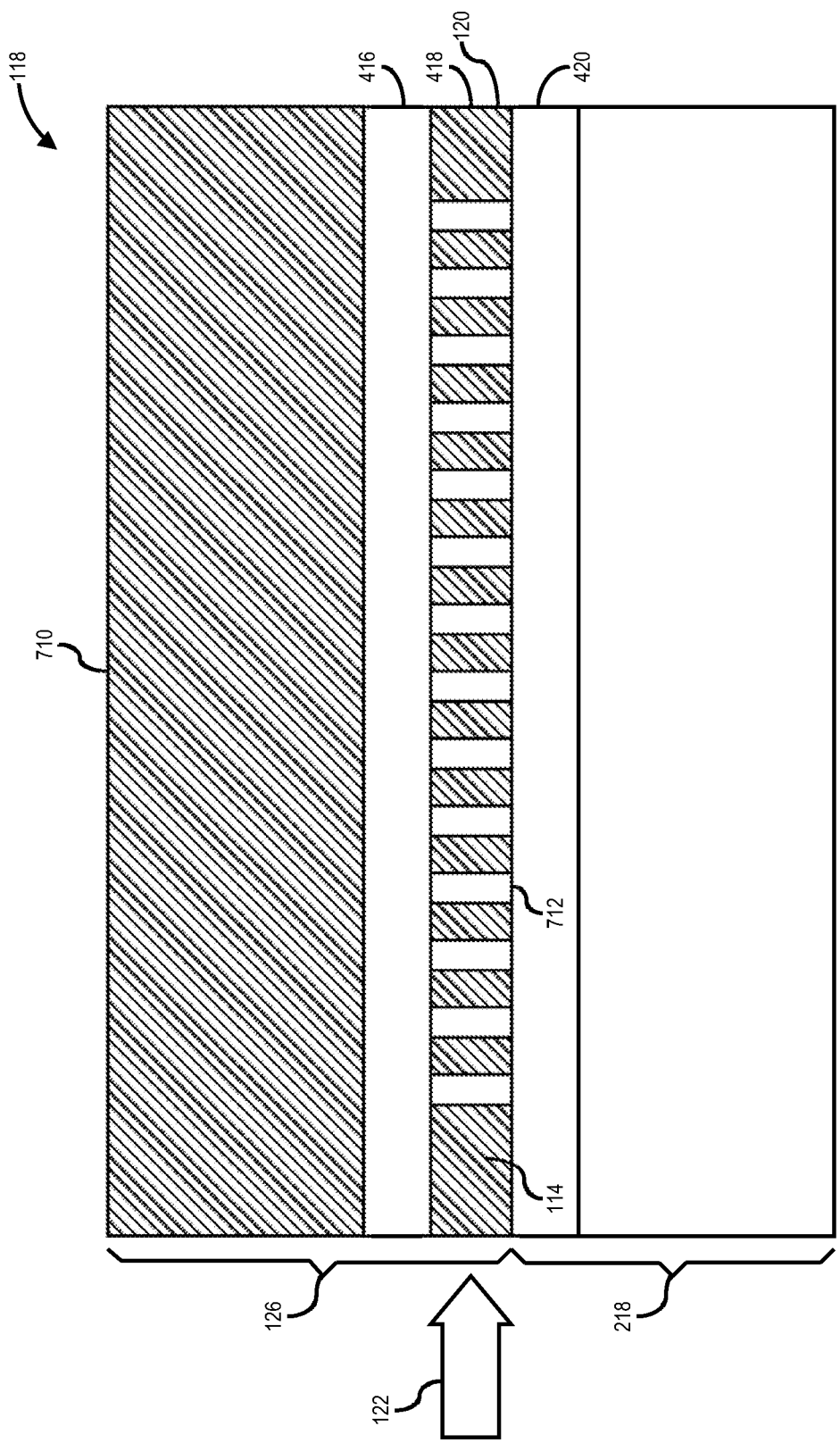
FIG. 7 is an elevation view of a photonics crystal superprism in accordance with one or more embodiments.

Referring now to FIG. 7, an elevation view of a photonics crystal superprism in accordance with one or more embodiments will be discussed. As shown in FIG. 7, the photonic crystal (PC) superprism 118 may be a silicon on insulator (SOI) structure 710 comprising the nanoscale photonics chip 126 stacked on electronics chip 218. The light beam 122 emitted by the modulator 116 enters the PC superprism 118 via waveguide 114. The superprism effect operating on the light beam 122 by the PC superprism 118 produces a large angular deflection of the light beam 122 wherein the amount of the deflection is dependent on the wavelength and/or input angle of the input light beam 122. The superprism effect has been demonstrated in infrared wavelengths for both input angle deflection and wavelength modulation utilized as a beam steering control input. In embodiments where the input beam 122 comprises a multicolored beam for utilization in a color projection display that produces a color image from combined red, green and blue light beams, the PC superprism 118 may operate via angular deflection rather than via wavelength modulation. In other embodiments, wavelength modulation may be utilized on individual color beams, and the scope of the claimed subject matter is not limited in this respect.

In one or more embodiments, the PC superprism 118 may be fabricated on the nanophotonics chip 126 in a high index layer 418 which may comprise, for example, silicon nitride (Si$_3$N$_4$). The high index layer 418 may be disposed between two dielectric layers, dielectric layer 416 and dielectric layer 420, which may comprise, for example, silicon dioxide (SiO$_2$). The high index layer 418 may have the photonic crystal structures 712 formed therein, for example via holographic patterning, e-beam lithography, and/or deep-ultraviolet (deep-UV) lithography, as some of many examples. In some embodiments, the photonic crystal structures 712 may comprise a photonic crystal pattern of structures approximately 130 nanometers (nm) in diameter having a pitch of approximately 400 nm, although the scope of the claimed subject matter is not limited in these respects. In one or more embodiments, the PC superprism 118 may provide about a twenty fold (20×) amplification of the deflection angle of the input light beam 122 provided by the modulator 116 for three visible wavelengths (red, blue, and green), to be utilized in a projection display. Suitable materials for the photonic crystal structures 712 formed in high index layer 418 may include silicon nitride (Si$_3$N$_4$) and titanium dioxide (TiO$_2$) which have been demonstrated to provide visible light photonic crystal properties. In some embodiments, modulation of the index of the superprism itself, for example via electro-optical modulation, may provide additional tuning of the PC superprism 118 for multicolor beam scanning or to otherwise simplify the overall design of the integrated beam scanner 100. Other materials have been demonstrated to provide infrared wavelength photonic crystal properties, for example an active lanthanum-modified lead zirconate titanate (PLZT) electro-optical superprism. Such invisible light beams when utilized in combination with one or more visible light beams may be utilized for example to provide a three-dimensional display projector. Furthermore, in general PC superprism 118 may be either a passive device or alternatively may comprise an active device wherein the superprism effect may be controlled via electro-optic modulation, and the scope of the claimed subject matter is not limited in these respects.

Figure 8:
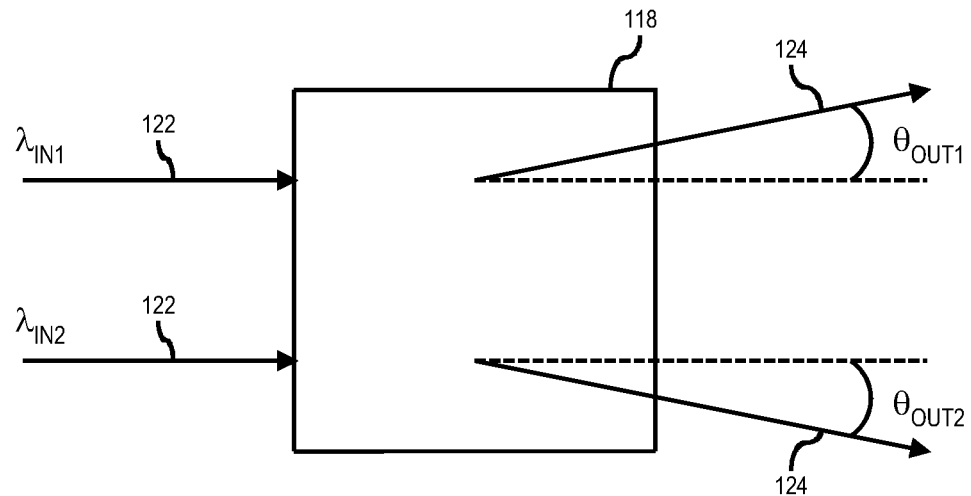
FIG. 8 is an illustration of the operation of the photonics crystal superprism of FIG. 7 wherein an output angle is dependent on the wavelength of an input beam in accordance with one or more embodiments.

Referring now to FIG. 8, an illustration of the operation of the photonics crystal superprism of FIG. 7 wherein an output angle is dependent on the wavelength of an input beam in accordance with one or more embodiments will be discussed. In FIG. 8, the input light beam 122 may enter the photonics crystal (PC) superprism 118 at a first input wavelength ($\lambda_{IN1}$) and exit PC superprism 118 as exit beam 124 at a first output angle ($\theta_{OUT1}$). Similarly, the input light beam 122 may enter the PC super prism 118 at a second input wavelength ($\lambda_{IN2}$) and exit the PC superprism 118 as exit beam 124 at a second output angle ($\theta_{OUT2}$). Thus, in one or more embodiments, the exit angle of the output beam 124 may be controlled via control of the wavelength of the input beam 122 wherein modulation of the wavelength of the input beam 122 applied to the PC superprism 118 may be utilized to cause the output beam 124 to scan in a controlled fashion.

Figure 9:
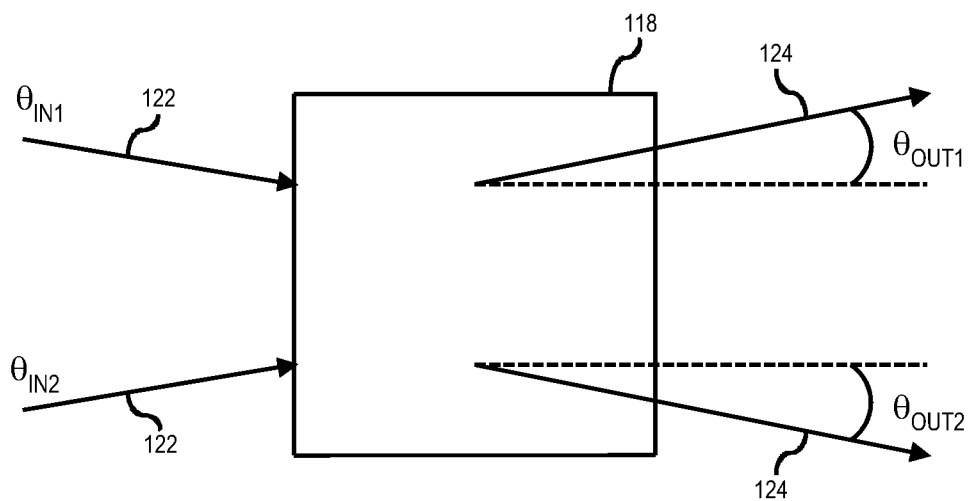
FIG. 9 is an illustration of the operation of the photonics crystal superprism of FIG. 7 wherein an output angle is dependent on the input angle of an input beam in accordance with one or more embodiments.

Referring now to FIG. 9, an illustration of the operation of the photonics crystal superprism of FIG. 7 wherein an output angle is dependent on the input angle of an input beam in accordance with one or more embodiments will be discussed. In FIG. 9, the input light beam 122 may enter the photonics crystal (PC) superprism 118 at a first input angle ($\theta_{IN1}$) and exit PC superprism 118 as exit beam 124 at a first output angle ($\theta_{OUT1}$). Similarly, the input light beam 122 may enter the PC super prism 118 at a second input angle ($\theta_{IN2}$) and exit the PC superprism 118 as exit beam 124 at a second output angle ($\theta_{OUT2}$). Thus, in one or embodiments the exit angle of the output beam 124 may be controlled via control of the input angle of the input beam 122 wherein modulation of the input angle of the input beam 122 applied to the PC superprism 118 may be utilized to cause the output beam 124 to scan across a controlled scan angle in a controlled fashion.

Figure 10:
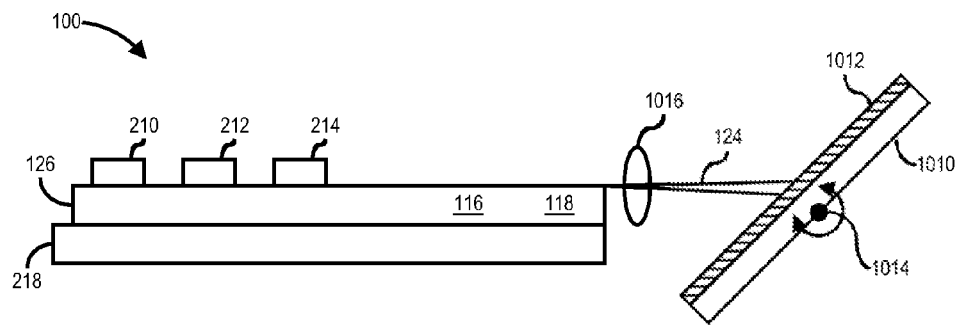
FIG. 10 is a diagram of one embodiment of a three color nanoscale integrated beam scanner capable of scanning in two dimensions in accordance with one or more embodiments.
Figure 11:
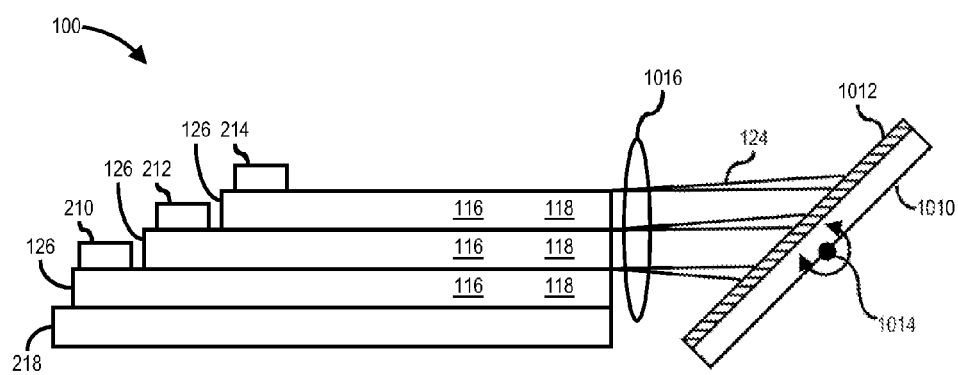
FIG. 11 is a diagram of another embodiment of a three color nanoscale integrated beam scanner capable of scanning in two dimensions in accordance with one or more embodiments.

Referring now to FIG. 10 and FIG. 11, diagrams of embodiments of a three color nanoscale integrated beam scanner capable of scanning in two dimensions in accordance with one or more embodiments will be discussed. As shown in FIG. 10, the beam scanner 100 may be utilized as a projection display or a laser distance and ranging (LADAR) device, or the like, which may involve two-dimensional scanning. In such embodiments, a second scanning axis may be provided by a scanning platform which may comprise a microelectromechanical system (MEMS) scanner 1010 having a scanning mirror 1012 disposed on a surface thereof and being capable of scanning in a second dimension about an axis 1014 of rotation, for example via torsional rotation of the MEMS scanner 1010 about axis 1014.

In one embodiment as shown in FIG. 10, the first scanning axis may be provided by the nanophotonics chip 126 to provide three visible light beams via light sources 210, 212, and 214, and to provide scanning along the first scanning axis via modulator 116 and PC superprism 118. In the embodiment shown in FIG. 10, the three light sources 210, 212, and 214 may be disposed on a single nanophotonics chip 126 which is stacked on an electronics chip 218, and which may share a single modulator 116 and PC superprism 118. The embodiment shown in FIG. 11 is substantially similar to the embodiment of FIG. 10, except that the first scanning axis may be provided by a stacked arrangement of multiple nanophotonics chips 126 stacked on an electronics chip 218 and each having a respective light source 210, 212, and 214, and each having a respective modulator 116 and PC superprism 118. The beam scanner 100 of FIG. 11 provides beam separation between the three individual beams and color channels, which in general may be any n number of beams and color channels, in order to accommodate the different net angle amplification for each of the individual wavelengths that would otherwise occur if the beams shared the same modulator 116 as with the embodiment of FIG. 10. By using a separate modulator 116 for each of the beams in the embodiment of FIG. 11, the scanning of each beam may be individually controllable to the same resulting scanning angle as the other beams. In general, the MEMS scanner 1010 may be disposed sufficiently proximate to the output of nanophotonics chip 126 such that divergence of the output beam 124 will not be very large as it intersects the scanning mirror 1012. Optionally, a beam shaping optic 1016 may be utilized to provide collimation in the plane normal to the nanophotonics chip 126 to further keep the output beam relatively small as it impinges the scanning mirror 1012. In some embodiments, the proximity of the MEMS scanner 1010 to the nanophotonics chip 126 may be achieved by co-fabricating the MEMS scanner 1010 along with the nanophotonics chip 126, or otherwise by assembling the MEMS scanner 1010 in close proximity to the nanophotonics chip 126. In some embodiments, the electronics chip 218 or circuits may be separately located from the nanophotonics chip 126 which need not necessarily be stacked together with the electronics chip 218. Furthermore, although a MEMS scanner 1010 is shown as providing scanning along a second axis, other types of devices may be utilized to provide the second axis scanning, including one or more additional nanophotonics chips, and the scope of the claimed subject matter is not limited in these respects.

Figure 12:
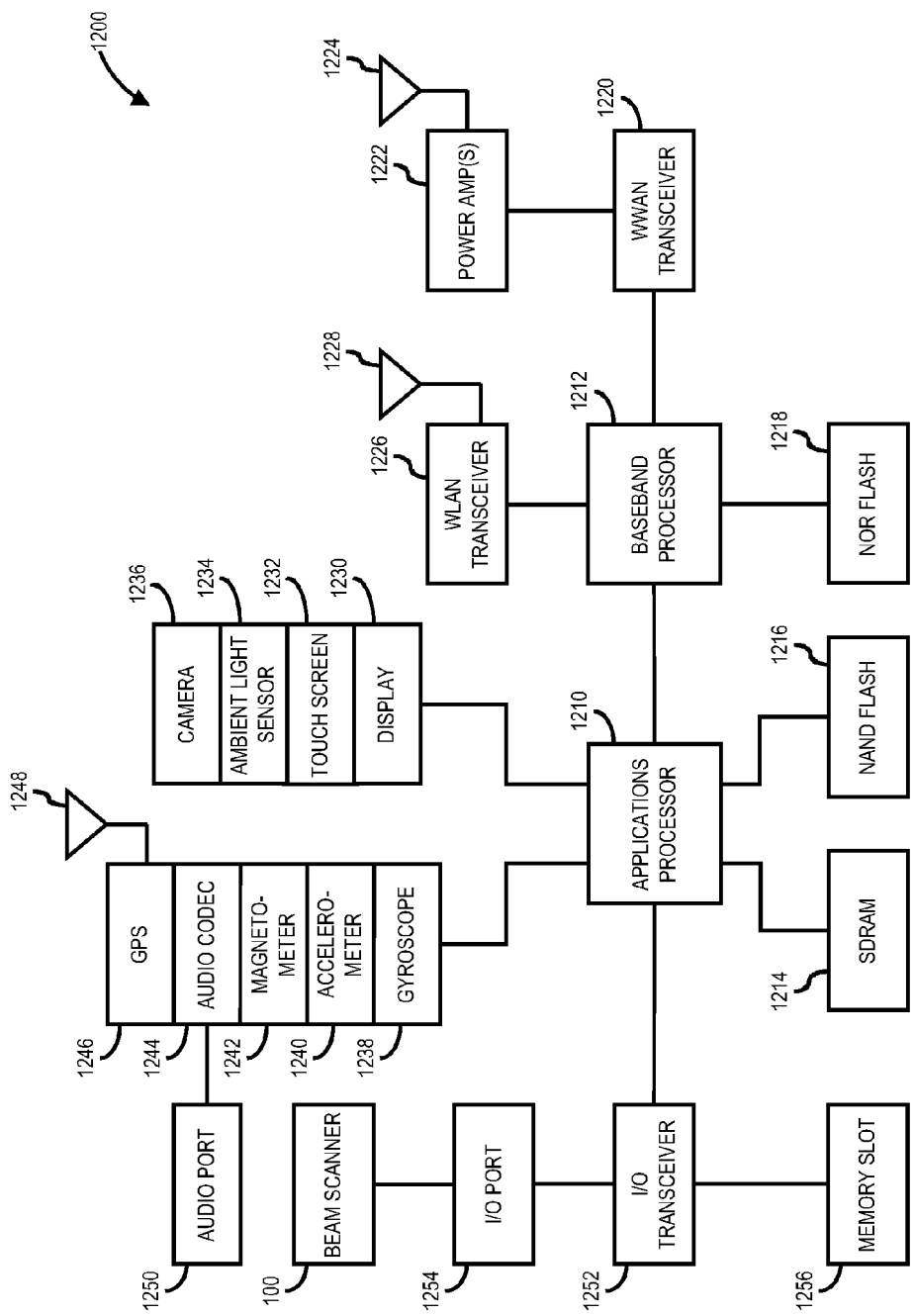
FIG. 12 is a block diagram of an information handling system capable of utilizing a nanoscale integrated beam scanner in accordance with one or more embodiments.

Referring now to FIG. 12, a block diagram of an information handling system capable of utilizing a nanophotonics beam scanner 100 in accordance with one or more embodiments will be discussed. Although information handling system 1200 represents one example of several types of computing platforms, such as a smartphone, tablet, hand held gaming device, personal computer or the like, information handling system 1200 may include more or fewer elements and/or different arrangements of elements than shown in FIG. 12, and the scope of the claimed subject matter is not limited in these respects. Information handling system 1200 may utilize the beam scanner 100 for example as a projection display to project an image on a display surface. However, the scope of the claimed subject matter is not limited in this respect.

In one or more embodiments, information handling system 1200 may include an applications processor 1210 and a baseband processor 1212. Applications processor 1210 may be utilized as a general purpose processor to run applications and the various subsystems for information handling system 1200. Applications processor 1210 may include a single core or alternatively may include multiple processing cores wherein one or more of the cores may comprise a digital signal processor or digital signal processing core. Furthermore, applications processor 1210 may include a graphics processor or coprocessor disposed on the same chip, or alternatively a graphics processor coupled to applications processor 1210 may comprise a separate, discrete graphics chip. Applications processor 1210 may include on board memory such as cache memory, and further may be coupled to external memory devices such as synchronous dynamic random access memory (SDRAM) 1214 for storing and/or executing applications during operation, and NAND flash 1216 for storing applications and/or data even when information handling system 1200 is powered off. Baseband processor 1212 may control the broadband radio functions for information handling system 1200. Baseband processor 1212 may store code for controlling such broadband radio functions in a NOR flash 1218. Baseband processor 1212 controls a wireless wide area network (WWAN) transceiver 1220 which is used for modulating and/or demodulating broadband network signals, for example for communicating via a Third Generation (3G) or Fourth Generation (4G) network or the like or beyond, for example a Long Term Evolution (LTE) network. The WWAN transceiver 1220 couples to one or more power amps 1222 respectively coupled to one or more antennas 1224 for sending and receiving radio-frequency signals via the WWAN broadband network. The baseband processor 1212 also may control a wireless local area network (WLAN) transceiver 1226 coupled to one or more suitable antennas 1228 and which may be capable of communicating via a Wi-Fi, Bluetooth, and/or an amplitude modulation (AM) or frequency modulation (FM) radio standard including an IEEE 802.11a/ b/g/n standard or the like. It should be noted that these are merely example implementations for applications processor 1210 and baseband processor 1212, and the scope of the claimed subject matter is not limited in these respects. For example, any one or more of SDRAM 1214, NAND flash 1216 and/or NOR flash 1218 may comprise other types of memory technology such as magnetic memory, chalcogenide memory, phase change memory, or ovonic memory, and the scope of the claimed subject matter is not limited in this respect.

In one or more embodiments, applications processor 1210 may drive a display 1230 for displaying various information or data, and may further receive touch input from a user via a touch screen 1232 for example via a finger or a stylus. An ambient light sensor 1234 may be utilized to detect an amount of ambient light in which information handling system 1200 is operating, for example to control a brightness or contrast value for display 1230 as a function of the intensity of ambient light detected by ambient light sensor 1234. One or more cameras 1236 may be utilized to capture images that are processed by applications processor 1210 and/or at least temporarily stored in NAND flash 1216. Furthermore, applications processor may couple to a gyroscope 1238, accelerometer 1240, magnetometer 1242, audio coder/decoder (CODEC) 1244, and/or global positioning system (GPS) controller 1246 coupled to an appropriate GPS antenna 1248, for detection of various environmental properties including location, movement, and/or orientation of information handling system 1200. Alternatively, controller 1246 may comprise a Global Navigation Satellite System (GNSS) controller. Audio CODEC 1244 may be coupled to one or more audio ports 1250 to provide microphone input and speaker outputs either via internal devices and/or via external devices coupled to information handling system via the audio ports 1250, for example via a headphone and microphone jack. In addition, applications processor 1210 may couple to one or more input/output (I/O) transceivers 1252 to couple to one or more I/O ports 1254 such as a universal serial bus (USB) port, a high-definition multimedia interface (HDMI) port, a serial port, and so on. Furthermore, one or more of the I/O transceivers 1252 may couple to one or more memory slots 1256 for optional removable memory such as secure digital (SD) card or a subscriber identity module (SIM) card, although the scope of the claimed subject matter is not limited in these respects. In one or more embodiments, the beam scanner may 100 be coupled to one or more of the I/O transceivers 1252 and may be integrated within a housing of information handling system 1200 or alternatively may be disposed exterior to the housing, although the scope of the claimed subject matter is not limited in these respects.

Figure 13:
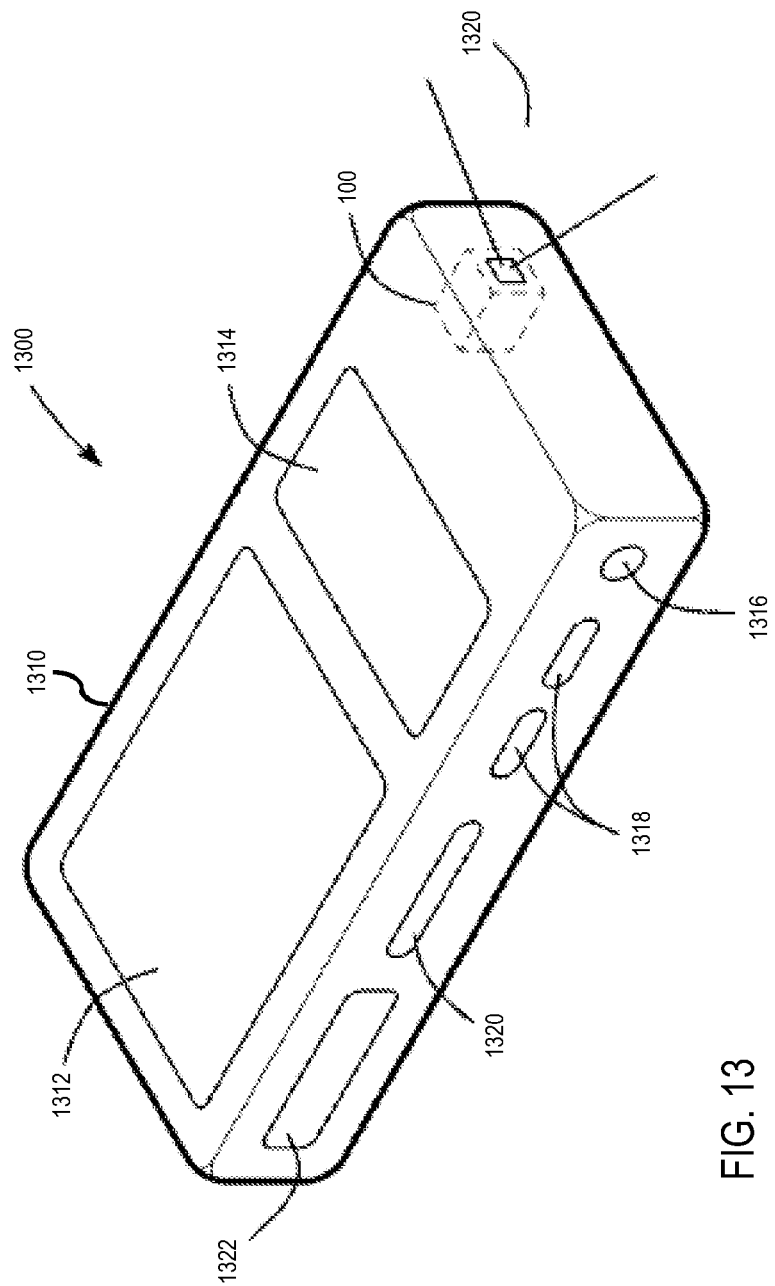
FIG. 13 is an isometric view of an information handling system that includes a nanoscale integrated beam scanner in accordance with one or more embodiments.

Referring now to FIG. 13, an isometric view of an information handling system that includes a nanoscale integrated beam scanner in accordance with one or more embodiments will be discussed. The information handling system 1300 of FIG. 13 may represent a tangible embodiment of the information handling system 1200 of FIG. 12. Information handling system 1200 may comprise any of several types of computing platforms, including cell phones, personal digital assistants (PDAs), netbooks, notebook computers, internet browsing devices, tablets, pads, and so on, and the scope of the claimed subject matter is not limited in these respects. In the example shown in FIG. 13, information handling system 1300 may comprise a housing 1310 to house beam scanner 100 as discussed herein, for example to provide a scanned output beam 1320 to project an image. Information handling system 1300 optionally may include a display 1312 which may be a touch screen display, keyboard 1314 or other control buttons or actuators, a speaker or headphone jack 1316 with optional microphone input, control buttons 1318, memory card slot 1320, and/or input/output (I/O) port 1322, or combinations thereof. Furthermore, information handling system 1300 may have other form factors and fewer or greater features than shown, and the scope of the claimed subject matter is not limited in these respects.

Figure 14:
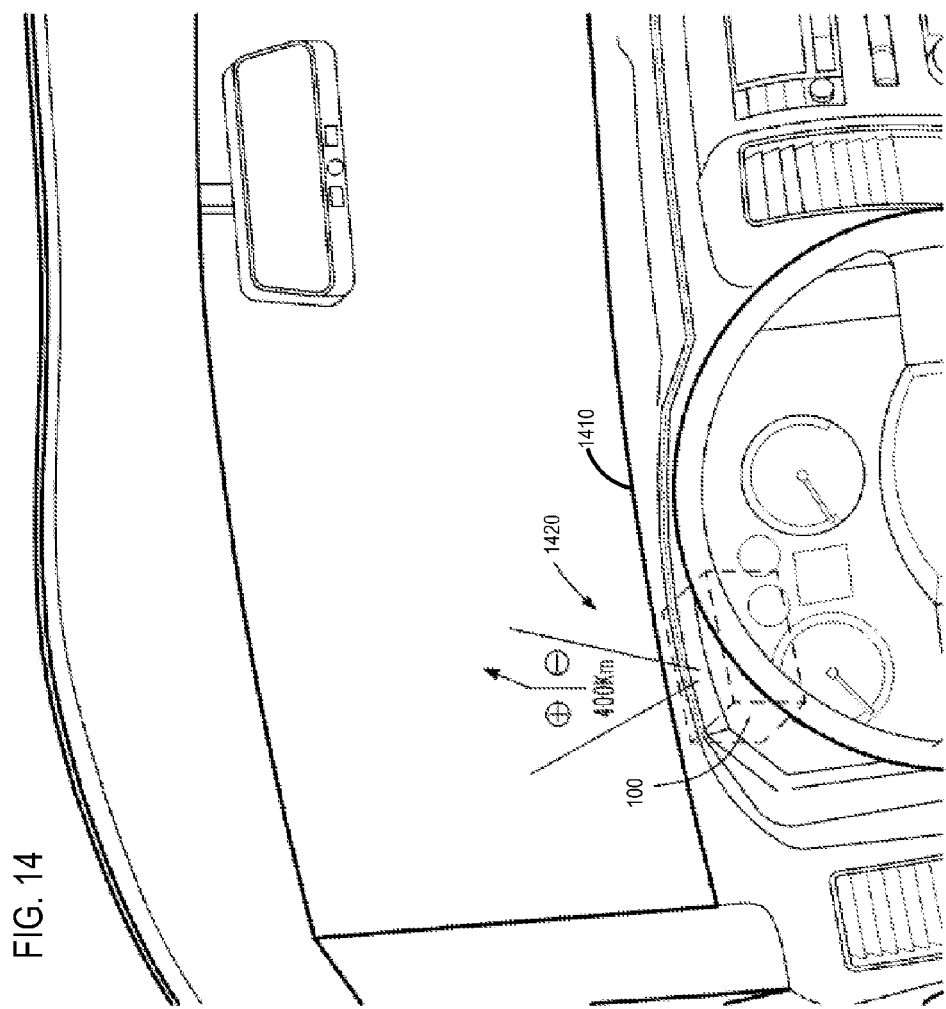
FIG. 14 is a diagram of a vehicle that includes a nanoscale integrated beam scanner deployed as a head up display in accordance with one or more embodiments.

Referring now to FIG. 14, a diagram of a vehicle that includes a nanoscale beam scanner deployed as a head up display in accordance with one or more embodiments will be discussed. In the embodiment shown in FIG. 14, the nanoscale beam scanner 100 may be deployed in a vehicle 1410 such as in the dashboard of the automobile 1410, and which may project an image 1420 that may be viewable by an operator or passenger of the vehicle. Although FIG. 14 shows one example deployment of a nanoscale beam scanner 100 as a display projector, other types of deployments likewise may be provided, and the scope of the claimed subject matter is not limited in this respect.

Figure 15:
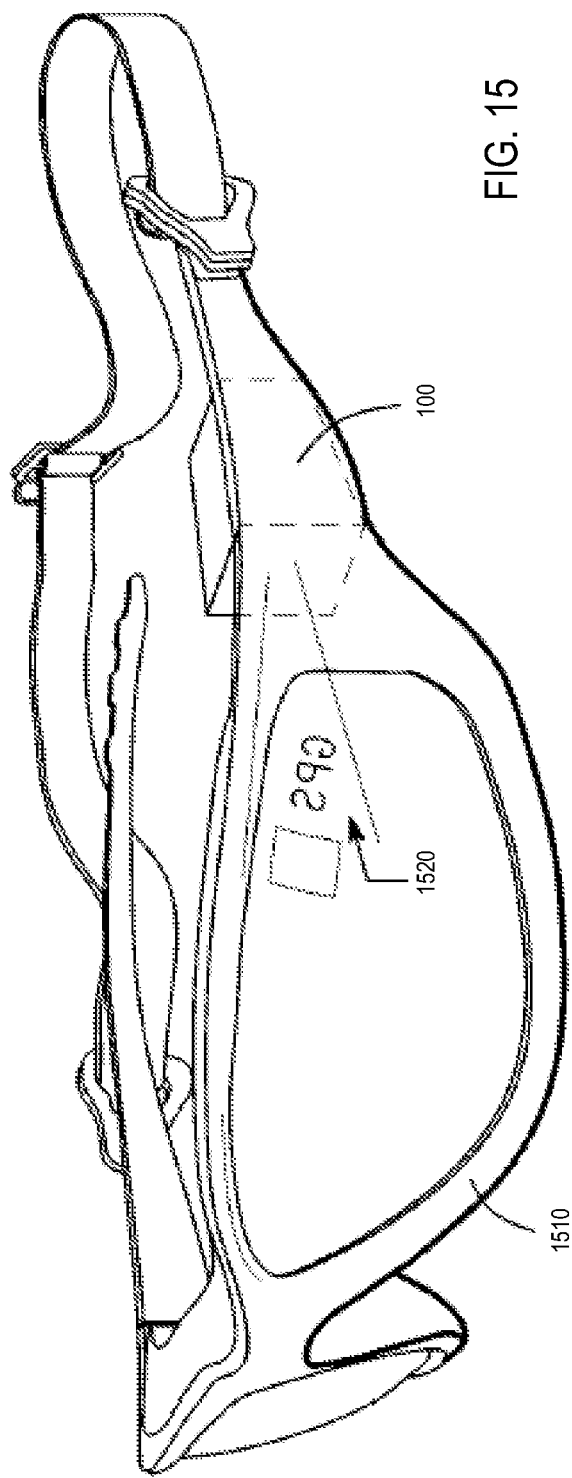
FIG. 15 is a diagram of eyewear that includes a nanoscale integrated beam scanner as a display in accordance with one or more embodiments.

Referring now to FIG. 15, a diagram of eyewear that includes a nanoscale integrated beam scanner in accordance with one or more embodiments will be discussed. In the embodiment shown in FIG. 15, the nanoscale beam scanner 100 may be deployed in eyewear 1510 or other head worn device, for example attached to a frame of the eyewear 1510, and which may project an image 1520 that may be viewable by the wearer of the eyewear 1510. Although FIG. 15 shows one example deployment of a nanoscale beam scanner 100 as a display projector, other types of deployments likewise may be provided, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to a nanoscale integrated beam scanner and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A photonics chip, comprising:
   a substrate;
   a grating in-coupler formed in the substrate to couple a beam from a light source into the substrate;
   a modulator to modulate the beam; and
   a photonic crystal (PC) superprism to provide a scanned output beam that is scanned in response to the modulated beam.

2. A photonics chip as claimed in claim 1, wherein the light source is coupled to the substrate.

3. A photonics chip as claimed in claim 1, wherein the light source comprises one or more light sources emitting a light beam having a respective wavelength.

4. A photonics chip as claimed in claim 1, wherein the light source comprises a laser light source.

5. A photonics chip as claimed in claim 1, further comprising a waveguide to guide the beam from the grating in-coupler to the modulator.

6. A photonics chip as claimed in claim 1, wherein the modulator is capable of modulating a wavelength of the beam or an input angle of the beam, or combinations thereof, as an input to the PC superprism.

7. A photonics chip as claimed in claim 1, wherein the modulator comprises an electro-optic device that is capable of modulating an input angle of the beam as an input to the PC superprism as a function of a voltage applied to the electro-optic device.

8. A photonics chip as claimed in claim 1, wherein the modulator comprises a microelectromechanical system (MEMS) device that is capable of altering the input angle of the beam as an input to the superprism as a function of a voltage applied to the MEMS device.

9. A photonics chip as claimed in claim 8, wherein the MEMS device comprises a comb drive structure having interdigitated comb fingers that electrostatically move in response to the applied voltage to alter the input angle of the beam.

10. A photonics chip as claimed in claim 1, further comprising a high index layer in which the grating in-coupler, or the PC superprism, or combinations thereof, are formed.

11. A photonics chip as claimed in claim 2, further comprising a metal layer disposed in the substrate to redirect at least a portion of the beam into the waveguide.

12. A photonics chip as claimed in claim 1, wherein an index of the PC superprism is electro-optically modulated via a voltage applied to the PC superprism to modulate the scanned output beam.

13. A photonics chip as claimed in claim 1, further comprising an optic to alter an optical property of the scanned output beam.

14. A beam scanner, comprising:
an electronics chip; and
a photonics chip stacked together with the electronics chip, wherein the electronics chip controls one or more functions of the photonics chip, the photonics chip comprising:
a substrate;
a grating in-coupler formed in the substrate to couple a beam from a light source into the substrate;
a modulator to modulate the beam; and
a photonic crystal (PC) superprism to provide a scanned output beam that is scanned along a first axis in response to the modulated beam.

15. A beam scanner as claimed in claim 14, wherein the light source comprises one or more light sources to provide one or more visible beams, or one or more invisible beams, or combinations thereof.

16. A beam scanner as claimed in claim 14, further comprising two or more photonics chips each having a light source of a respective wavelength to provide a multicolor scanned output beam.

17. A beam scanner as claimed in claim 14, further comprising a scanning platform to receive the scanned output beam and scan the output beam along a second axis to provide two dimensional scanning of the output beam.

18. A beam scanner as claimed in claim 17, wherein the scanning platform comprises a microelectromechanical system (MEMS) scanner having a scanning mirror to reflect the scanned output beam.

19. A two-dimensional beam scanner, comprising:
a photonics chip comprising:
a substrate;
a grating in-coupler formed in the substrate to couple a beam from a light source into the substrate;
a modulator to modulate the beam; and
a photonic crystal (PC) superprism to provide a scanned output beam that is scanned along a first axis in response to the modulated beam; and
a scanning platform to scan the output beam along a second axis.

20. A two-dimensional beam scanner as claimed in claim 19, wherein the light source comprises one or more light sources to provide one or more visible beams, or one or more invisible beams, or combinations thereof.

21. A two-dimensional beam scanner as claimed in claim 19, further comprising two or more photonics chips each having a light source of a respective wavelength to provide a multicolor scanned output beam.

22. A two-dimensional beam scanner as claimed in claim 19, wherein the scanning platform comprises a microelectromechanical system (MEMS) scanner having a scanning mirror to reflect the scanned output beam.

23. An information handling system, comprising:
a processor; and
a beam scanner coupled to the processor to scan a beam in response to instructions executed by the process, the beam scanner comprising a photonics chip, wherein the photonics chip comprises:
a substrate;
a grating in-coupler formed in the substrate to couple a beam from a light source into the substrate;
a modulator to modulate the beam; and
a photonic crystal (PC) superprism to provide a scanned output beam that is scanned in response to the modulated beam.

24. An information handling system as claimed in claim 23, further comprising a touch screen to receive an input to control the processor.

* * * * *